(12) United States Patent
Compton et al.

(10) Patent No.: US 12,741,699 B2
(45) Date of Patent: Sep. 22, 2026

(54) TAILGATE CABLE TENSIONER

(71) Applicant: FCA US LLC, Auburn Hills, MI (US)

(72) Inventors: Gene Compton, Clinton Township, MI (US); Christopher J Antenucci, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 371 days.

(21) Appl. No.: 18/532,235

(22) Filed: Dec. 7, 2023

(65) Prior Publication Data

US 2025/0187678 A1 Jun. 12, 2025

(51) Int. Cl.
*B62D 33/027* (2006.01)

(52) U.S. Cl.
CPC ................................ *B62D 33/0273* (2013.01)

(58) Field of Classification Search
CPC ............................ B62D 33/0273; B62D 33/03
USPC ........................................................ 296/57.1
See application file for complete search history.

(56) References Cited

U.S. PATENT DOCUMENTS 6,126,223 A 10/2000 Rayburn
6,951,358 B1 10/2005 Ousley et al.
7,093,876 B2 8/2006 Romig et al.
7,229,116 B1 * 6/2007 Bruford .................... B60P 3/40 296/57.1
7,677,626 B2 3/2010 Hanzel
8,070,207 B2 12/2011 Zielinsky
8,075,038 B2 12/2011 Zielinsky
8,109,553 B2 2/2012 Zielinsky
2002/0070576 A1 * 6/2002 Rayburn ................ B60P 1/438 296/61
2005/0212320 A1 * 9/2005 Ousley ............... B62D 33/0273 296/57.1
2005/0217075 A1 10/2005 Enomoto
2015/0353147 A1 * 12/2015 Bernhardt ............ B23P 11/005 29/520
2022/0135147 A1 5/2022 Robinson et al.

FOREIGN PATENT DOCUMENTS

JP 5627242 B2 11/2014
KR 100368357 B1 1/2003
KR 20230117215 A 8/2023

* cited by examiner

*Primary Examiner* — Amy R Weisberg
*Assistant Examiner* — Alma D. Schuster
(74) *Attorney, Agent, or Firm* — Jeremy J. Klobucar

(57) ABSTRACT

A tailgate cable tensioner having a body. A securement mechanism attaches and secures the body to a cable terminal of a cable. A biasing member applies a force on a bolt retaining the cable terminal for taking sag out of the cable.

10 Claims, 3 Drawing Sheets

12
24
10
28
34

26
32
30
14
31
30
28
32

31
42
16
26
40
10
28
40
16

42

TAILGATE CABLE TENSIONER

FIELD

The present disclosure relates to vehicles and, more particularly, to tailgate cable tensioners.

BACKGROUND

This section provides background information related to the present disclosure which is not necessarily prior art.

Vehicles with tailgates generally utilize a cable to enhance the securement of the tailgate with the truck bed as well as position the tailgate in an open position. Some of the tailgates include cables on both sides. The cables sometimes, due to the variances in the body system components stack up from left to right, a sag or slack in the cable is evident on one of the sides when the tailgate is open without force applied on the tailgate. This gives an aesthetically unpleasing perception. While there is nothing wrong with the system, the user perceives a quality issue in the appearance of the sagging cable. This has caused warranty issues for the manufacture wherein the buyer believes that this not normal and returns it to a dealer. Thus, it is desirable to eliminate the perceived quality issue of sagging tailgate cables and the related warranty issues with the tensioner that takes up the slack or sag in the cable.

Accordingly, the present disclosure provides the art with such a tensioner.

The present disclosure provides the art with an inexpensive cable tensioner that is easily positioned onto the vehicle. The present disclosure provides a tensioner that provides a biasing tensioner that eliminates the slack in the cable. The present disclosure provides tension on the cable to eliminate the sagging appearance. When the present disclosure is in tension, the device enables the cable to bottom out on the bolt as it is originally intended. Thus, the present disclosure provides tension on the cables caused by variance in the ministack parts of the vehicle system. Accordingly, the present disclosure desensitizes the visual effects of the body built.

SUMMARY

This section provides a general summary of the disclosure, and is not a comprehensive disclosure of its full scope or all of its features.

According to a first aspect of the disclosure, a tailgate cable tension comprises a body with a securement mechanism for attaching and securing the body to a cable terminal. The biasing member applies a force on a bolt retaining the cable terminal in a tensioned position to eliminate sag in the cable. The securement mechanism snaps over the cable terminal and includes a groove and stop to receive and retain it on the cable. The biasing member is a spring and preferably a pair of leaf springs. The leaf springs eject from the body at a desired angle and are likewise molded into it.

According to a second aspect of the disclosure, a vehicle with tailgate cable tensioner comprises a vehicle with a drop down tailgate and a cable with a terminal on at least one side of the tailgate between the tailgate and the vehicle body. A tensioner on the cable terminal comprises a body with a securement mechanism for attaching and securing the body to a cable terminal. The biasing member applies a force on a bolt retaining the cable terminal in a tensioned position to eliminate sag in the cable. The securement mechanism snaps over the cable terminal and includes a groove and stop to receive and retain it on the cable. The biasing member is a spring and preferably a pair of leaf springs. The leaf springs eject from the body at a desired angle and are likewise molded into it.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 4:
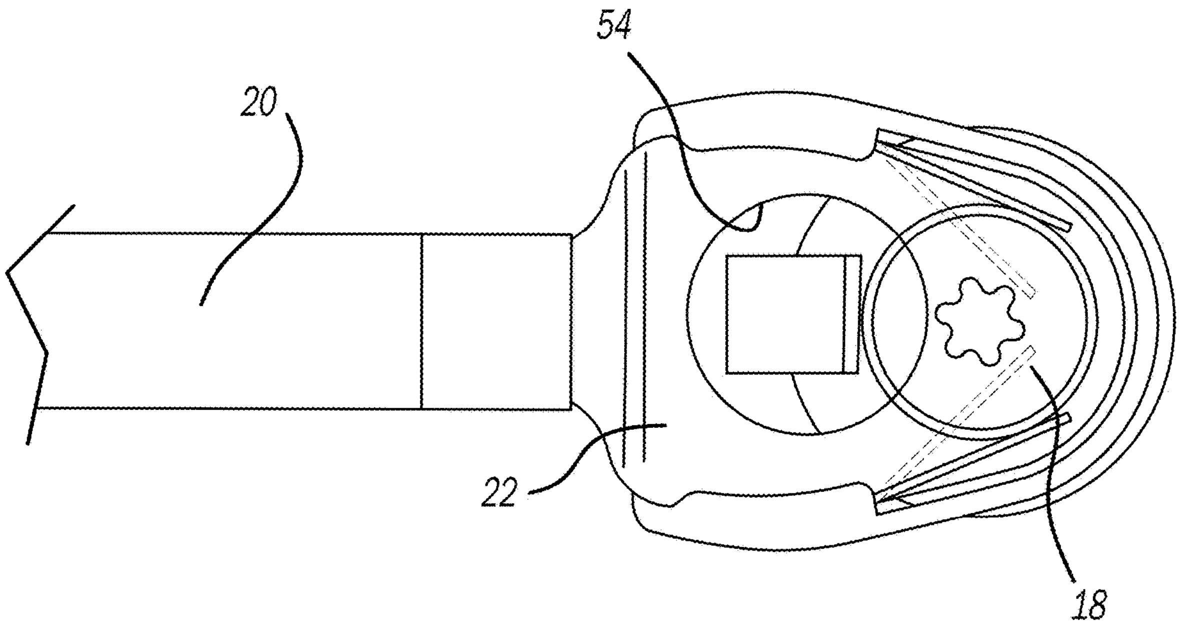
FIG. 4 is a cross-sectional view of FIG. 1 along lines 4-4 on a cable terminal.
Figure 5:
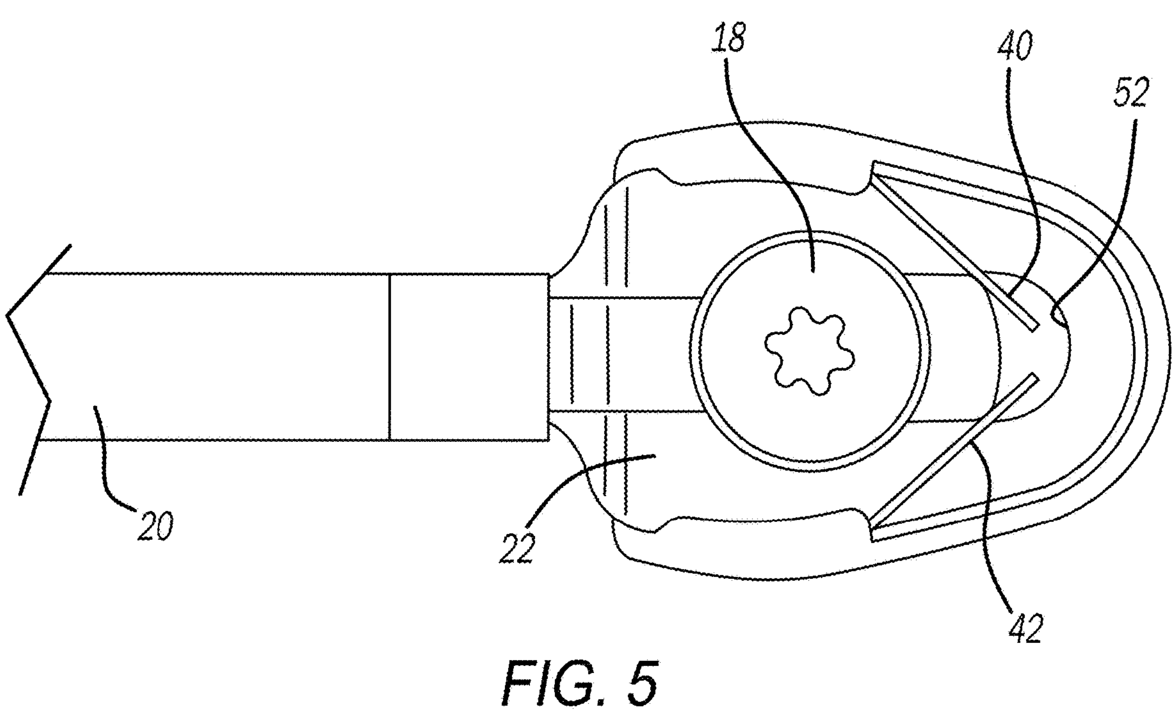
FIG. 5 is a cross-sectional view like FIG. 4 with the bolt in a section position.
Figure 6:
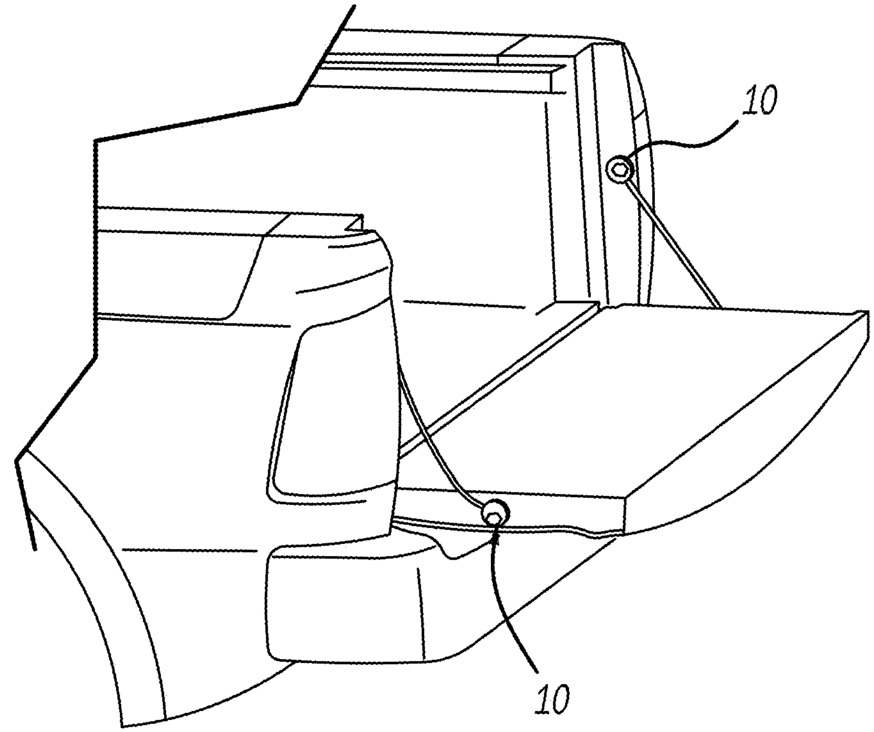
FIG. 6 is a perspective view of a vehicle tailgate.

Turning to the figures, a tailgate truck tensioner clip is illustrated and designated with the reference numeral 10. The tensioner clip 10 includes a body 12 with a securement mechanism 14 and a biasing member 16 that applies a force or load onto the bolt 18 to remove the sag from the cable 20. The clip 10 is secured to the cable terminal 22 as illustrated in FIGS. 4 and 5.

The body 12 has a cover 24 with a projecting skirt 26. The body 12 is opened underneath the cover and in between the skirt 26. An opening that is a cut out 28 is in the cover 24.

The securement mechanism 14 includes a pair of nubs 30, 31. The nub 30 extends from the cover 24 while the nub 31 extends from the terminal edge of the skirt 26. The nubs form a groove 32 to receive the terminal 22. Also, a stop 34 is at the end of the securement mechanisms 14. The securement mechanisms 14 include a pair of receivers that receive the terminal 22. Once the terminal 22 is positioned into the body 12, the stops 34 are at the end of the terminal to lock on the terminal to prohibit the body from removal from the terminal 22. Thus, the securement mechanisms 14 retain the body onto the cable terminal 22.

Figures 1, 2, 3:
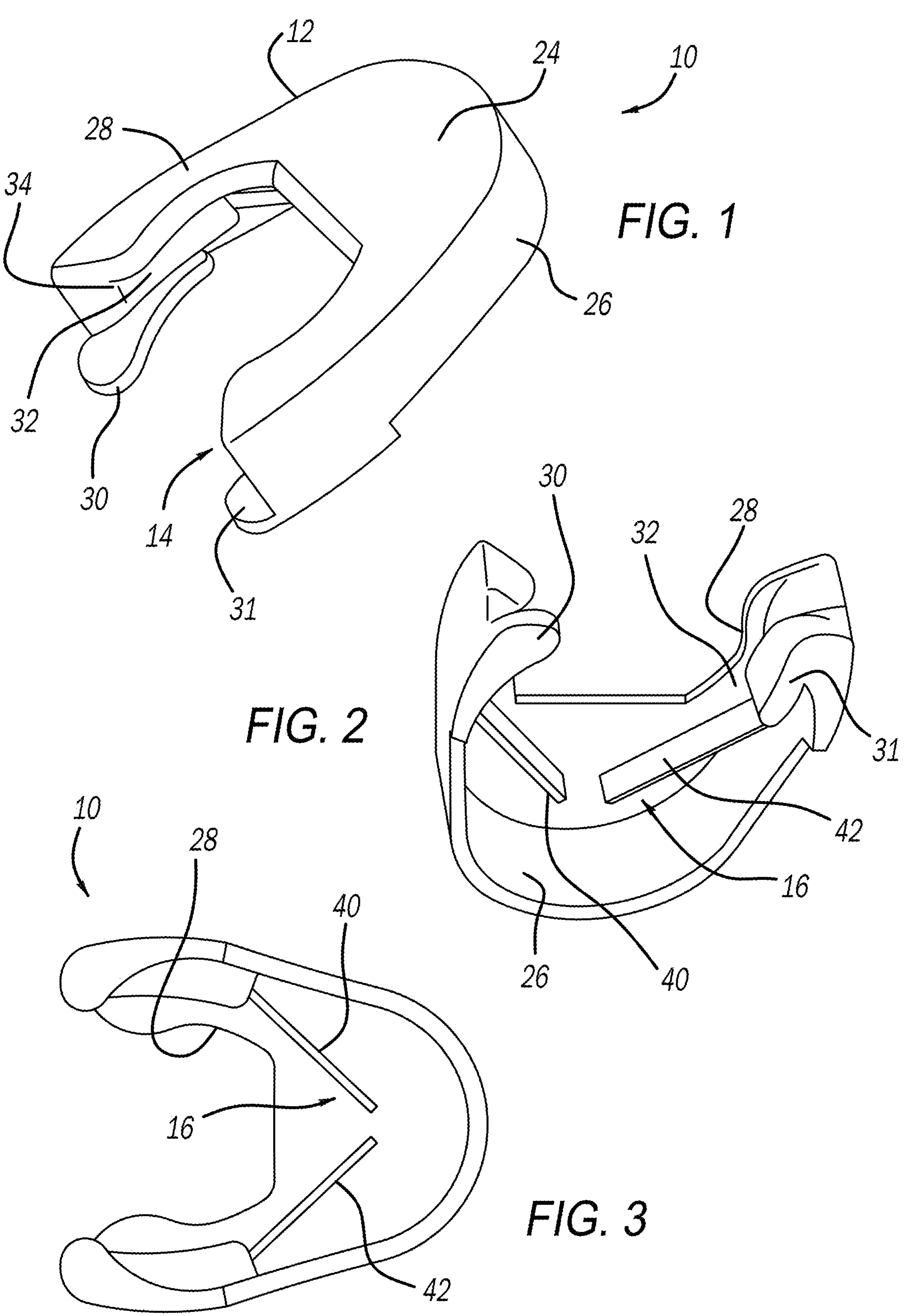
FIG. 1 is a perspective view of the cable tensioner.
FIG. 2 is a bottom perspective view of the tensioner.
FIG. 3 is a bottom elevation view of the tensioner.

The biasing means 16 in the drawings include a pair of leaf springs 40, 42. Leaf springs 40, 42 extend from the skirt 26. The leaf springs 40, 42 are molded into the skirt 26 to provide the biasing force. The leaf springs 40, 42 are at a desired angle with respect to the wall of the skirt 26. This is best illustrated in FIG. 3. Other types of biasing springs may be utilized for the leaf springs 40, 42. Thus, as will be explained, the springs exert the force onto the bolt to pick up the slack in the cable.

As the tensioner clip 10 is positioned onto the terminal 22, the leaf springs 40, 42 are spread away from one another and exert a force onto the bolt 18. This is illustrated in FIGS. 4 and 5. Thus, as the leaf springs are spread exerting a force onto the bolt 18, the force pushes downward towards the cable 20 which, in turn, pulls the cable upward removing the slack out of the cable 20. Thus, when the tensioner is on the bolt 18, as seen in FIG. 4, the slack is removed from the cable 20. As a force is applied to the tailgate, as the tailgate is lifted, the bolt moves into the second opening 52 of the terminal 22. Thus, the bolt is removed from the first opening 54 into the second opening wherein the force is removed from the leaf springs and allowing the tailgate to be closed. Thus, in a downward position, when a force is not exerted on the tailgate, the tensioner 10, due to the leaf springs, removes the slack from the cable 20. Likewise, the leaf springs 40, 42 if a force is put onto the tailgate continue to enable the cable to be taunted due to the force. Thus, the tensioner clip 10 eliminates the sag or slack in the cable providing an overall aesthetic appearance to the cable which is pleasing to the user. Thus, this eliminates the sagging cable appearance as well as dealer complaints that this is not an acceptable feature and that the need for warranty issues is resolved.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tailgate cable tensioner comprising:

a body;

a securement mechanism for attaching and securing the body to a cable terminal of a cable;

a biasing member for applying a force on a bolt retaining the cable terminal for taking sag out of the cable, wherein the biasing member includes a pair of leaf springs.

2. The tailgate cable tensioner of claim 1, wherein the securement mechanism snaps over the cable terminal.

3. The tailgate cable tensioner of claim 2, the securement mechanism further comprising a groove for receiving the cable terminal.

4. The tailgate cable tensioner of claim 1, wherein the leaf springs project from the body at a desired angle.

5. The tailgate cable tensioner of claim 1, wherein the leaf springs are molded into the body.

6. A vehicle with a tailgate cable tensioner comprising:

a vehicle having a drop down tailgate;

a cable, with a terminal on at least one side of the tailgate between the tailgate and the vehicle body;

a tensioner on the cable terminal comprising:

a body;

a securement mechanism for attaching and securing the body to a cable terminal of a cable;

a biasing member for applying a force on a bolt retaining the cable terminal for taking sag out of the cable, wherein the biasing member includes a pair of leaf springs.

7. The vehicle with a tailgate cable tensioner of claim 6, wherein the securement mechanism snaps over the cable terminal.

8. The vehicle with a tailgate cable tensioner of claim 7, the securement mechanism further comprising a groove for receiving the cable terminal.

9. The vehicle with a tailgate cable tensioner of claim 6, wherein the leaf springs project from the body at a desired angle.

10. The vehicle with a tailgate cable tensioner of claim 6, wherein the leaf springs are molded into the body.

* * * * *